(12) United States Patent
Daft et al.

(10) Patent No.: US 7,508,113 B2
(45) Date of Patent: Mar. 24, 2009

(54) APPARATUS FOR TWO-DIMENSIONAL TRANSDUCERS USED IN THREE-DIMENSIONAL ULTRASONIC IMAGING

(75) Inventors: Christopher M. Daft, Pleasanton, CA (US); Igal Ladabaum, San Carlos, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 809 days.

(21) Appl. No.: 10/982,693

(22) Filed: Nov. 5, 2004

(65) Prior Publication Data

US 2005/0261589 A1 Nov. 24, 2005

Related U.S. Application Data

(60) Provisional application No. 60/572,560, filed on May 18, 2004.

(51) Int. Cl.
  *B06B 1/06* (2006.01)
  *A61B 8/14* (2006.01)
  *H01L 41/08* (2006.01)
  *H04R 17/00* (2006.01)

(52) U.S. Cl. .................. 310/319; 310/318; 310/334

(58) Field of Classification Search ............. 310/318, 310/319, 322, 334
See application file for complete search history.

(56) References Cited

U.S. PATENT DOCUMENTS

| 4,341,120 | A | | 7/1982 | Anderson |
| 4,694,434 | A | | 9/1987 | Von Ramm et al. |
| 5,229,933 | A | | 7/1993 | Larson, III |
| 5,406,163 | A | * | 4/1995 | Carson et al. ............. 310/334 |
| 6,126,602 | A | | 10/2000 | Savord et al. |
| 6,246,158 | B1 | * | 6/2001 | Ladabaum ................ 310/334 |
| 6,589,180 | B2 | * | 7/2003 | Erikson et al. ............. 600/459 |
| 6,806,623 | B2 | * | 10/2004 | Petersen et al. ............ 310/334 |
| 6,891,311 | B2 | * | 5/2005 | Phelps et al. .............. 310/317 |
| 2003/0048698 | A1 | | 3/2003 | Barnes et al. |
| 2006/0150380 | A1 | * | 7/2006 | Ossmann ................ 29/25.35 |

FOREIGN PATENT DOCUMENTS

WO  WO/2004/109656  * 12/2004

OTHER PUBLICATIONS

Reston, et al., "Pressure-Sensitive Field-Effect Transistor Sensor Array Fabricated From a Piezoelectric Polyvinylidene Fluoride Film", *Advanced Topics in Biorobotics*, 2 pages.
Plummer, et al., "An Ultrasonic Imaging System for Realtime Cardiac Imaging", *IEEE International Solid-State Circuits Conference*, 1974, pp. 162-163.

* cited by examiner

Primary Examiner—Thomas M Dougherty

(57) ABSTRACT

A single chip transducer apparatus that includes on-chip electronic circuitry which, when connected properly to a two-dimensional matrix of ultrasonic transducer elements, provides enough information to an external imaging system to form three-dimensional images of the subject of interest. In a preferred embodiment, the circuitry provides an amplifier for each transducer element, and then conditions the output of the amplifier in several ways. In one embodiment of the invention, the elements' analog voltages are stored in a sample and hold circuit, and time multiplexed into a high speed line driver that sends many elements data down the interconnect to the system's high speed Analog to Digital converters. In another embodiment, the gain of the amplifiers can be controlled in time to provide aperture translation and time based expansion for translating and focusing image slices in the elevation direction.

23 Claims, 6 Drawing Sheets

APPARATUS FOR TWO-DIMENSIONAL TRANSDUCERS USED IN THREE-DIMENSIONAL ULTRASONIC IMAGING

This application claims priority to U.S. Provisional Application Ser. No. 60/572,560 filed May 18, 2004

BACKGROUND OF THE INVENTION

1. Field of the Invention

Generally, the present invention relates to ultrasound imaging. More specifically, the present invention relates to microfabricated transducers with associated electronics capable of three-dimensional ultrasound imaging.

2. Description of the Related Art

An acoustic transducer is an electronic device used to emit and receive sound waves. Ultrasonic transducers are acoustic transducers that operate at frequencies above 20 KHz, and more typically, in the 1-20 MHz range. Ultrasonic transducers are used in medical imaging, non-destructive evaluation and other applications. The most common forms of ultrasonic transducers are piezoelectric transducers. In U.S. Pat. No. 6,271,620 entitled, "Acoustic Transducer and Method of Making the Same," issued Aug. 7, 2001, Ladabaum describes microfabricated ultrasonic transducers (MUTs) capable of competitive performance compared to piezoelectric transducers.

In U.S. Pat. No. 6,246,158, Ladabaum teaches monolithic integration of MUTs with circuitry. The basic transduction element of the MUT is a vibrating capacitor. A substrate contains a lower electrode, a thin diaphragm is suspended over the substrate and a metallization layer serves as an upper electrode. If a DC bias is applied across the lower and upper electrodes, an acoustic wave impinging on the diaphragm will set it in motion, and the variation of electrode separation caused by such motion results in an electrical signal. Conversely, if an AC signal is applied across the biased electrodes, the AC forcing function will set the diaphragm in motion, and this motion emits an acoustic wave in the medium of interest.

In U.S. Pat. No. 6,430,109. Khuri-Yakub et al. teach the use of through-wafer vias to provide electrical connections to MUT elements and thus allow connection to an image processing chip. The image processing chip is not described, and the through-wafer interconnects are taught to provide a means for control voltages and electrical excitation of MUTs. The focus of this referenced prior art is transmission; reception details are not taught.

Integration of piezoelectric materials with electronics is also known in the art, as is taught in Plummer, J., Meindl, J., and Maginness, M., "An Ultrasonic Imaging System for Real-time Cardiac Imaging," Proceedings of the IEEE International Solid-State Circuits Conference, 1974, p. 162-163. PVDF (polyvinyl di-fluoride), a piezoelectric polymer, can be formed on an electronic substrate. See, for example, Reston, R. and Kolesar, E, "Pressure-sensitive field-effect transistor sensor array fabricated from a piezoelectric polyvinylidene fluoride film, Proceedings of the IEEE Engineering in Medicine and Biology Society, 1989, p. 918-919. The authors are not aware of high quality medical imaging piezoelectric materials successfully integrated directly on top of electronic circuits, such as PZT-5H, for example, though it may be that in the future high quality composite piezoelectrics are successfully formed on top of electronics. The present invention is taught with respect to a monolithically integrated MUT transducer embodiment, but need not be limited to it. Piezoelectric, through-wafer via MUTs, or other currently unknown transducer layers may be used on the electronic circuitry herein disclosed.

In U.S. Pat. No. 6,106,472, Chiang and Broadstone teach a system and method of beam formation within a probe housing. The beam formation is accomplished by the sampling, delay, and summation of ultrasonic channel data. The compact nature of the beamformer is made possible by a CCD delay chip.

None of these references teaches or claims specific structures or methods directed to 3-D imaging.

Savord et al., in U.S. Pat. No. 6,381,197, describe the use of both bias lines and FET switches to control the aperture of a MUT array, but do not teach specific structures or methods directed to 3-D imaging.

Ultrasound systems that generate three-dimensional (3-D) images of the subject of interest are available today. Most of the commercially available systems form three-dimensional images form multiple two-dimensional (2-D) slices taken by a mechanically translating or rotating probe. An example of such a system is General Electric's Voluson 730, which has its origins from the work of Kretz in Austria. U.S. Pat. No. 4,341,120, issued in 1982, describes a multi-element probe that is electronically scanned in the azimuth direction, but is mechanically moved to capture image slices in the elevation direction.

Mechanical translation suffers from several disadvantages, among them cost, reliability, and mechanical jitter. The resolution of the reconstructed image in the elevation direction is a function of the slice thickness of the elevation profile of the transducer, as well as of the positioning accuracy of the mechanical translation scheme or device.

Other approaches to 3-D imaging are also known in the art. Systems based on two dimensional transducer arrays are taught, for example, in U.S. Pat. Nos. 4,694,434, 5,229,933 and 6,126,602. One disadvantage of these conventional 3-D imaging systems based on 2-D transducer arrays is that the interconnecting circuitry between each individual transducer element and its associated control circuitry can be difficult and expensive to design and manufacture. Furthermore, parasitic resistance, capacitance, and cross-talk in the interconnect paths can degrade the performance of the imaging system.

In both mechanically scanned and electronically scanned approaches for 3-D imaging known in the art, a disadvantage is the slow frame-rate of 3-D images that is a function of a 3-D image being formed from many 2-D slices.

In imaging applications, an ultrasonic transmitter sends ultrasound waves into the subject of interest, and an ultrasonic receiver detects the return waveforms. Typically in medical imaging, the transmitter and receiver are the same transducer array, and timing between the elements of the array is varied during transmit and receive events to form images. However, the transmitter need not necessarily be the same as the receiver. It has been realized by the present inventors that as long as sufficient signal-to-noise ratio is available, a fully populated matrix of transducers can capture enough information during receive events to form 3-D images of the subject of interest. The present invention relates to the electronic circuitry used to control a two-dimensional matrix of transducers during receive events. The transducer matrix and electronics can be MUT transducers monolithically integrated with underlying electronics, as taught by Ladabaum, MUT transducers connected by through-wafer vias to the electronics, as taught by Khuri-Yakub, PVDF transducers formed over the electronics and connected to them, or other piezoelectric transducers not yet reduced to practice. It is critical that the interconnect paths between transducer element and electronics have insignificant parasitic resistance and capacitance. Thus, the monolithic approach is the preferred embodiment.

Thus, what is needed is electronic circuitry that can be used with a fully populated two-dimensional transducer array (matrix), preferably, for example, integrated immediately below the transducer matrix, and that can provide sufficient information for the formation of three-dimensional images by a 3-D ultrasound imaging system. The present invention provides such circuitry.

SUMMARY OF THE INVENTION

The present invention provides an electronic circuit chip that, when properly connected to a large aperture, fully-populated 2-D transducer matrix, provides sufficient information to an imaging system to form 3-D images of the region of interest. The electronic circuit achieves this by providing an amplifier for each element of the transducer matrix. In one embodiment of the present invention the amplifier's output is connected to signal conditioning electronics and ultimately to an analog sample-and-hold circuit. The voltages stored in the analog circuit corresponding to several elements are then rapidly read out by a multiplexer, and transmitted to the imaging system's high speed A/D converter by a line driver and a suitable interconnect. In another embodiment of the present invention, the analog sample-and-hold circuit is triggered at different times for different elements in a set, and the stored voltage samples in the set are summed together before transmission to the system's A/D converter. In yet another embodiment of the present invention, the output of the amplifiers is summed without the track and hold circuit, with the gain of each amplifier in the element set varied in time to control elevation aperture and focusing. In yet another embodiment, frequency domain multiplexing is used as opposed to time-base multiplexing so that a single interconnect line can carry many channels worth of data.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Figure 1:
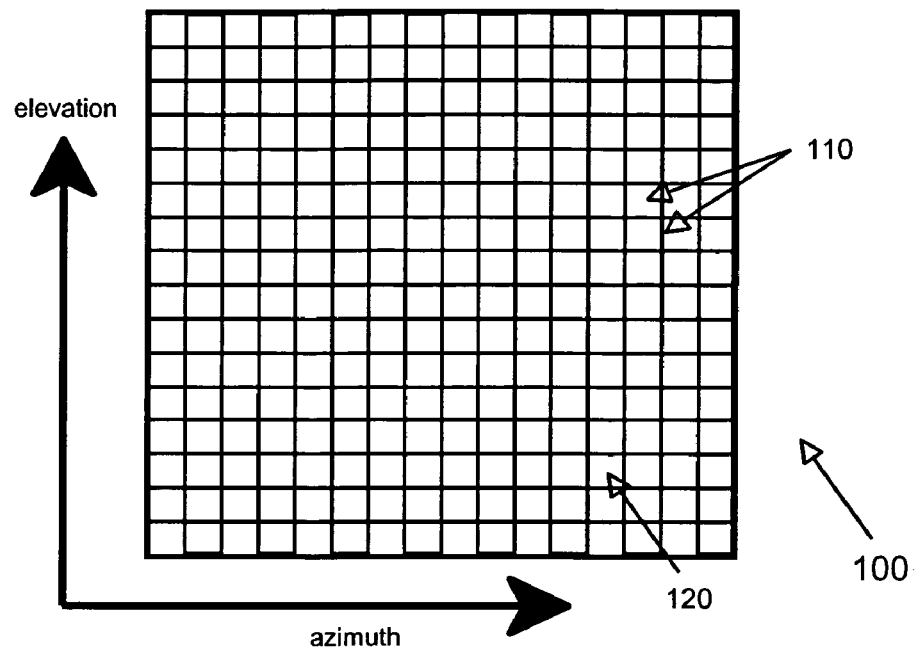
FIG. 1 illustrates the a fully populated receive aperture used to implement a three-dimensional (3-D) imaging system according to an embodiment of the present invention.

FIG. 1 illustrates a fully populated receive aperture 100 used to implement a three-dimensional (3-D) imaging system according to an embodiment of the present invention. Such an aperture can produce high quality 3-D images. As shown in FIG. 1 for illustrative purposes, the 2-D capacitive microfabricated ultrasonic transducer (cMUT) array consists of a two-dimensional (2-D) grid of cMUT elements 110. The vertical columns of cMUT elements are in the elevation direction, with the azimuth direction shown along the horizontal direction (i.e., in rows). Below the cMUT cells (not shown), according to an aspect of this embodiment, there can be integrated electronics and signal conditioning circuitry 120, which can be integrated circuits disposed into the substrate of the cMUT. While it is preferred that the circuitry for each cell be disposed below that cell, other arrangements are within the scope of this invention, such that the integrated electronics and signal conditioning circuitry 120 is below the transducer array.

The present invention and its several embodiments focus on electronic circuitry capable of transmitting sufficient information from each transducer element in a 2-D matrix to a 3-D imaging system. For example, if there are N elements in the azimuth direction of the array, and M elements in its elevation direction, then NM intermediate outputs need to be read out into the ultrasound system. Image quality requirements of modern scanners dictate that the product NM>4000. Of course the present invention will be equally as applicable to future advances in the art of scanners. It is impractical to connect a cable to each of the elements and provide a probe which can be manually manipulated by the sonographer. Various multiplexing methods for achieving the communication between the transducer and the ultrasound system according to the present invention are described below.

As will become evident to those skilled in the art in view the teaching of at least some aspects of the present invention, the exemplary embodiments are not intended to be limited to use with capacitive microfabricated ultrasonic transducers. Rather, aspects of the present invention are equally applicable to many other types of transducers, including, but not limited to, piezoelectric polymers (e.g., polyvinyl difluoride, or PVDF), piezoelectric film (e.g., sol gel spin-on depositions) and other piezoelectric materials (e.g., PZT-5H). Further, the electronics taught by the present invention, while illustrated as being monolithically integrated with the transducer matrix, can be a separate integrated circuit or discrete elements or a combination of all of the above (i.e., on-chip, off-chip, integrated, discrete, etc.).

Figure 2:
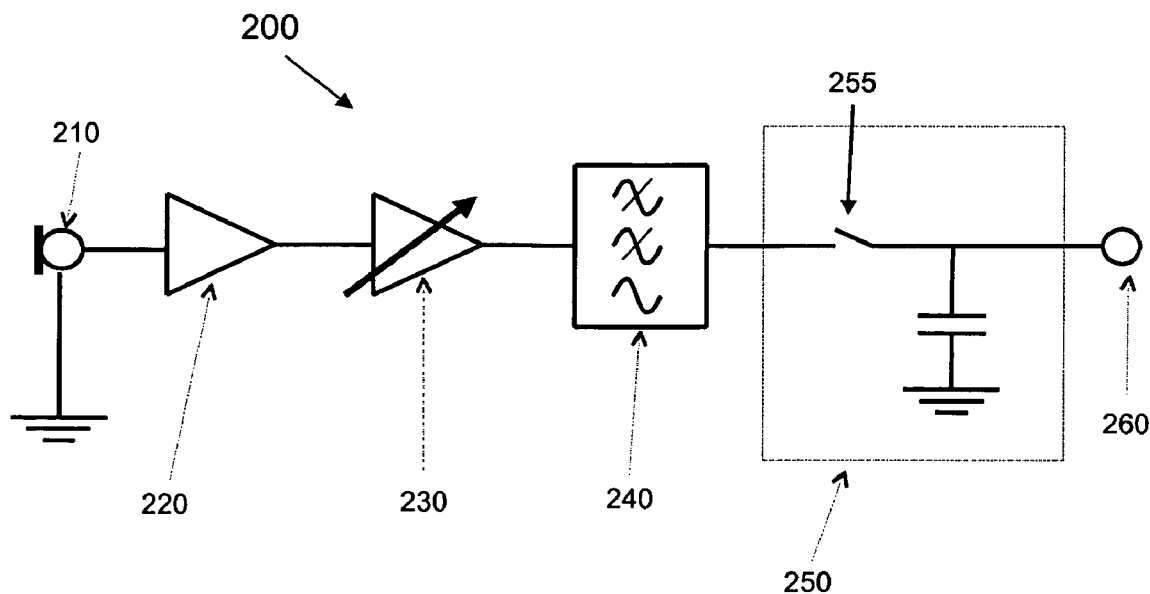
FIG. 2 illustrates exemplary signal conditioning circuitry that can be integrated below the cMUT array according to an embodiment of the present invention.

FIG. 2 illustrates exemplary signal conditioning circuitry 200 that can be integrated below the cMUT array according to an embodiment of the present invention. As shown in FIG. 2, the acoustic element 210 can be first connected to a low noise amplifier 220 with high input impedance. This tends to raise the signal level above the thermal noise floor, and can buffer the impedance from that of the element 210 to make the subsequent circuitry more straightforward. The input impedance of this amplifier 220 can affect the acoustic reflectivity of the receiver surface, and should therefore be chosen judiciously. For example, this input impedance can be approximately the complex conjugate of the electrical impedance of the transducer element 210 (as first taught in U.S. patent application Ser. No. 10/803,808 to Hossack et al., filed on Mar. 17, 2004 and entitled "Electric Circuit for Tuning a Capacitive Electrostatic Transducer").

The output of the low noise amplifier 220 can be connected to a variable-gain stage 230. This stage can decrease the dynamic range requirements of the electronics that follow it by increasing its gain with time, for example, as the acoustic pulse is attenuated through the body. Following the time gain control stage 230 is an anti-aliasing filter 240, which can substantially eliminate (i.e., attenuate to below an electrically-significant level) the frequency content in the signal above the Nyquist frequency. The Nyquist frequency can be set by the clock rate of the next stage, a sample and hold circuit 250, and is generally equal to about twice the frequency of the upper frequency edge of the desired passband. The sample and hold circuit can include a track-and-hold trigger 255 that, in this embodiment can be driven by a fixed frequency. In one embodiment, after the signal conditioning circuitry, an amplified and sampled signal is available at the intermediate output 260 under each 2-D array element for the duration of each clock period.

Figure 3:
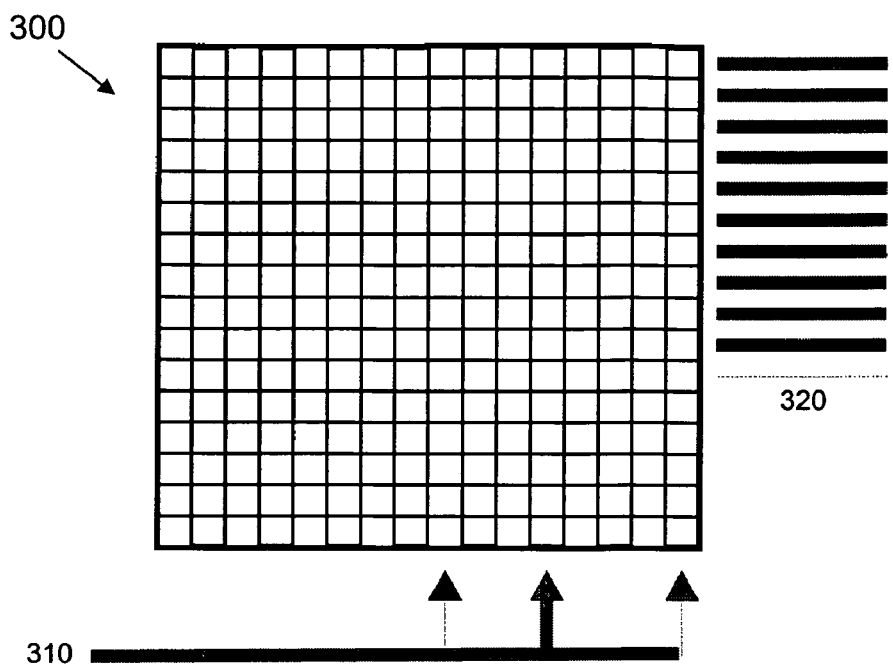
FIG. 3 illustrates a column multiplexed readout method according to an embodiment of the present invention.

In the simplest embodiment, the receive chip is simply read out one column at a time. A three dimensional image can be formed at the expense of N times the number of transmit-receive events required for a two dimensional image. A typical modern ultrasound machine can form 30 2-D images per second, so in the case of an N by M transducer matrix, a volumetric image could be obtained in N/30 seconds. As an example the transducer matrix might be a 64 by 128 matrix, so that a volumetric image frame would require 2.1 seconds. FIG. 3 illustrates a column multiplexed readout chip 300 according to an embodiment of the present invention. A multiplexer can connect one column out of N 310 to the M interconnects 320 which are wired to the ultrasound system. The disadvantage of this approach is the slow nature of the image acquisition, and thus the requirement that the subject of interest remain still over the acquisition time period, or that motion compensation algorithms be employed by the system. As will be evident to those skilled in the art with reference to this disclosure, the azimuth rows could just as easily be multiplexed in M times the number of transmit-receive events, and N azimuth interconnects connected to the ultrasonic system.

Figure 4:
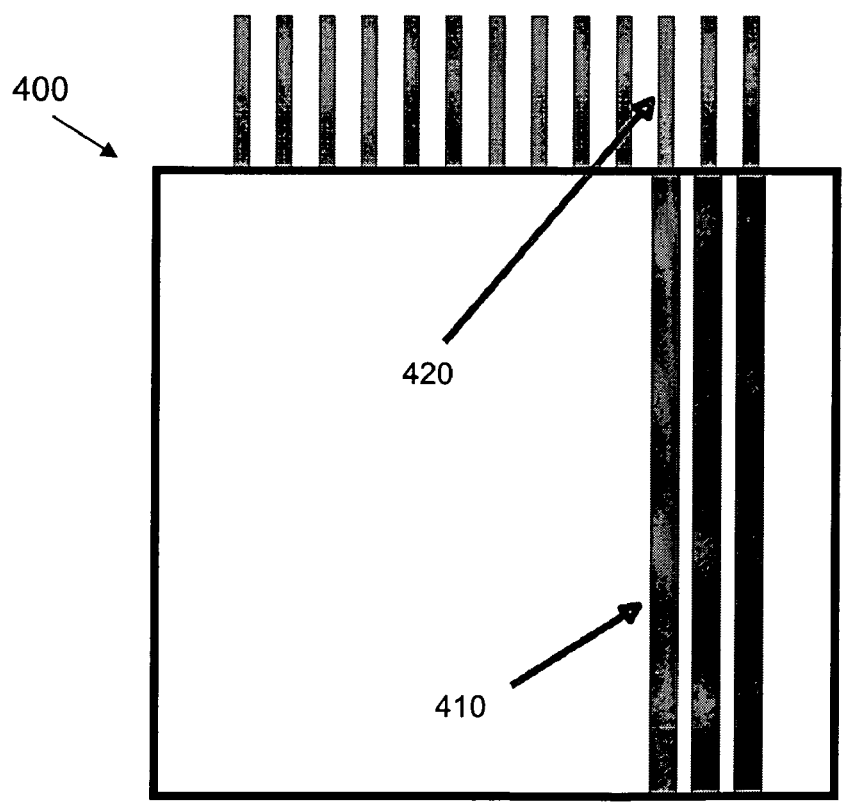
FIG. 4 illustrates a method that multiplexes the outputs of many elements (e.g., M elevation elements) together in time according to an embodiment of the present invention.

Another embodiment of the present invention is illustrated in FIG. 4, which shows a chip 400 that captures samples of each transducer element at the Nyquist rate, for example, 20 Mega-samples per second, but during the holding period, quickly and serially multiplexes the sampled outputs of many elements (e.g., M elevation elements) to a single system interconnect line. This type of time multiplexing is much faster because even though the ultrasonic sampling rate is 20 Megasamples per second, by way of example, the serialized data rate can be at least ten times faster. For example, the voltage from each element of a line of elements 410 is connected sequentially to the input of a high-speed amplifier and coaxes 420, and the combined data sent to the ultrasound system. This process can occur at about 200 Mega-samples per second, and even faster, depending on the electrical characteristics of the interconnect path and the line driver. Line drivers with GHz bandwidths are known in the art. In this way, the number of interconnects can be reduced to a manageable number. As will be evident to those skilled in the art with reference to this disclosure, the azimuth rows could just as easily be multiplexed in time, and M elevation interconnects connected to the ultrasonic system. According to this aspect, all of the information from every element in the array can be preserved.

Figure 5:
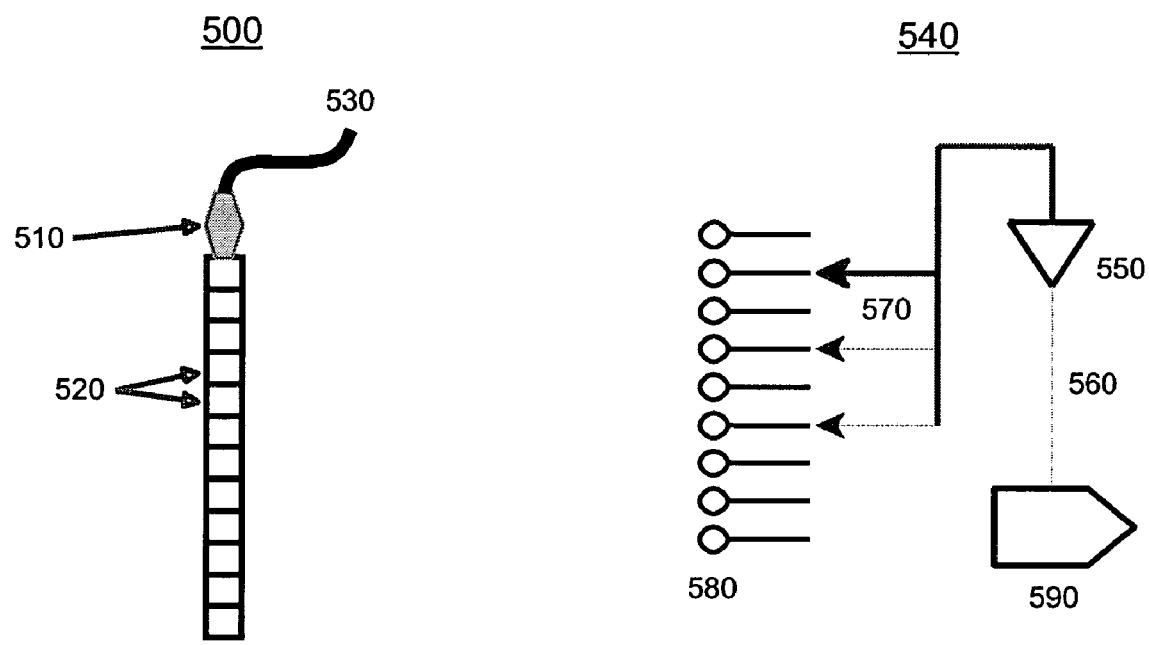
FIG. 5 illustrates a line amplifier that can be at the end of the lines of the multiplexed transducer elements according to an embodiment of the present invention.

FIG. 5 illustrates more detail of the multiplexed line of elements 500 of the embodiment of FIG. 4. As shown in FIG. 5, a high speed line amplifier 510 can be at the end of the lines of the multiplexed transducer elements 520 according to an embodiment of the present invention. The line amplifier 510 can also be connected to the ultrasound system (not shown) via a high-speed output 530. The electrical circuit 540 for this embodiment can include the line driver 550 that serves as an impedance buffer between the system interconnect 560 and the multiplexing 570 of the transducer elements' intermediate outputs 580, and provides sufficient power to drive the interconnect line 560 with high analog fidelity to the A/D converter 590 in the ultrasound system.

Upon review of the preceding description of time multiplexing, it will be clear to those skilled in the art that the same effect can be obtained by frequency domain multiplexing. Instead of dividing up the available clock period into smaller slices of time, the bandwidth is divided up and the channel data modulated up to unique frequency segments of the bandwidth available in the line amplifier and interconnect. On the system end, filters, either digital or analog, can be used to extract the waveforms corresponding to each element. This and other variations in multiplexing methods are intended to be within the scope of the present invention.

Another aspect of the present invention includes control of the transducer array such that delays can be introduced between elements in the elevation direction, for example, and that subsequently samples are summed to provide a partially beam-formed output. In some applications, it may be advantageous to have such a pre-beam-formed output, which emerges at a lower data rate than that produced by a time-multiplexed or frequency-multiplexed output. The bandwidth required at the interconnect path and A/D converter would only need to be enough to pass the sampled output of a single channel. This bandwidth is typically in the range of about 20 MHz up to about 70 MHz.

Figure 6:
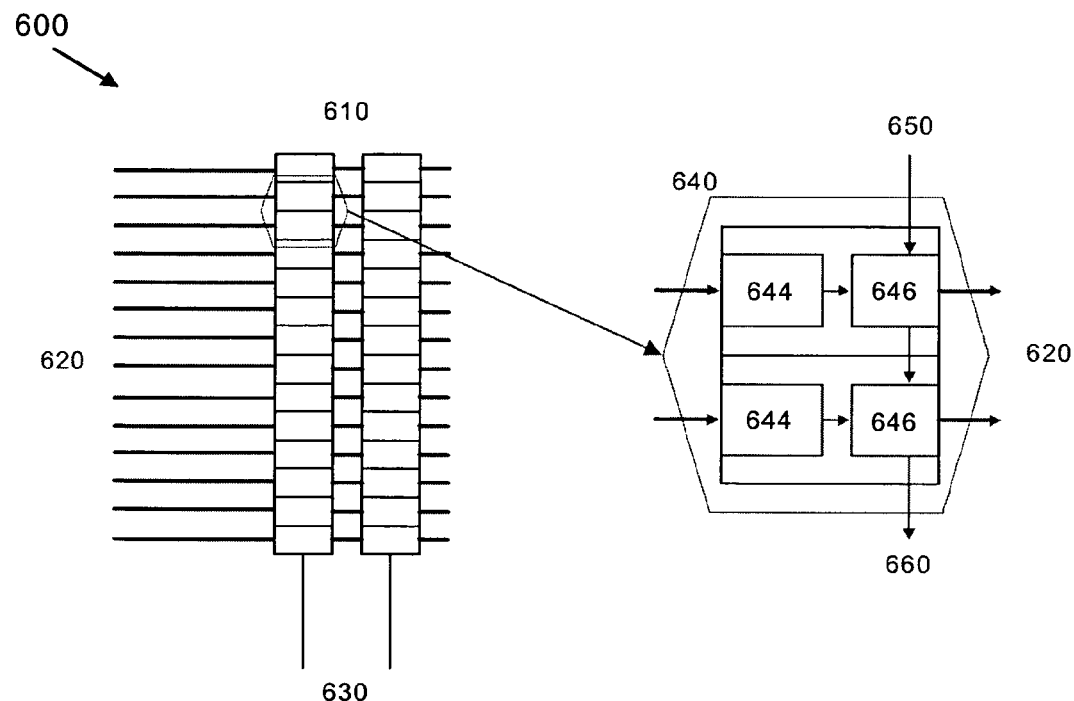
FIG. 6 illustrates the circuit architecture for partial beam formation according to an embodiment of the present invention.

FIG. 6 illustrates the circuit architecture for a partially beam-formed transducer 600 according to an embodiment of the present invention. In this embodiment, each element's track-and-hold trigger (not shown) is not driven with a fixed frequency. Instead, the elevation control lines 620 create a dynamically varying delay between adjacent elevation elements 640, which determines the elevation beam steering angle and the focal length, and can be provided in the system 630. They create a dynamic focus on receive by supplying a delay 644 that compensates for the difference in travel time between adjacent elements 640 and adding 646 in that delay. Thus, a delay from an adjacent element 650 is passed to the adder 646 of that adjacent element, and so on 660. The quantity of delay changes as the sound pulse travels deeper into the body, for example; the schedule of such delay changes depends on the element's location. This achieves a "tracking lens" ensuring that the received signal is in focus at all times. For high-quality beam formation, dynamic control of amplitude is also necessary. This may be accomplished by supplying appropriate control signals to the previously described time-gain-control block. If the focal range is r, and the elevation steering angle is φ, two elements positioned at (y, 0) and (y+Δy, 0) require a delay of:

$$\Delta t = \frac{1}{c}\left[\sqrt{(r\sin\phi - y)^2 + r^2\cos^2\phi} - \sqrt{(r\sin\phi - [y + \Delta y])^2 + r^2\cos^2\phi}\right]$$

in which r=r(t) for dynamic focusing. This delay is accomplished in two ways; for a coarse delay (i.e. a delay greater than the sampling period), an analog FIFO is provided between the elements. The fine delay is realized by slipping the sampling clock. Note that this delay can be substantially identical for all members of an elevation row, so that the delay control can be substantially identical across an elevation row, as illustrated conceptually in the close-up view in FIG. 6. Although each "elevation delay control" is depicted as one line, in actual physical implementation, each "elevation delay control" line in the schematic can correspond to several conductive traces that control the sample trigger as well as the reconfigurable FIFO. One of the key attributes is that the control traces can extend across the array because each azimuth element has substantially identical elevation control.

The consequence of this on-chip processing is that pre-beam-formed data is available at the output of each piece of the overall azimuth element 630. In the simplest case, the entire azimuth column 630 undergoes beam formation. If there are N azimuth columns in the array, these N lines travel over traditional cables to the imaging system. In the system, dynamic delays are provided to create focusing in the azimuth direction: for elements at (x, 0) and (x+Δx, 0) and an azimuth steering angle of θ, $$\Delta t = \frac{1}{c}\left[\sqrt{(r\sin\theta - x)^2 + r^2\cos^2\theta} - \sqrt{(r\sin\theta - [x + \Delta x])^2 + r^2\cos^2\theta}\right]$$

Figure 7:
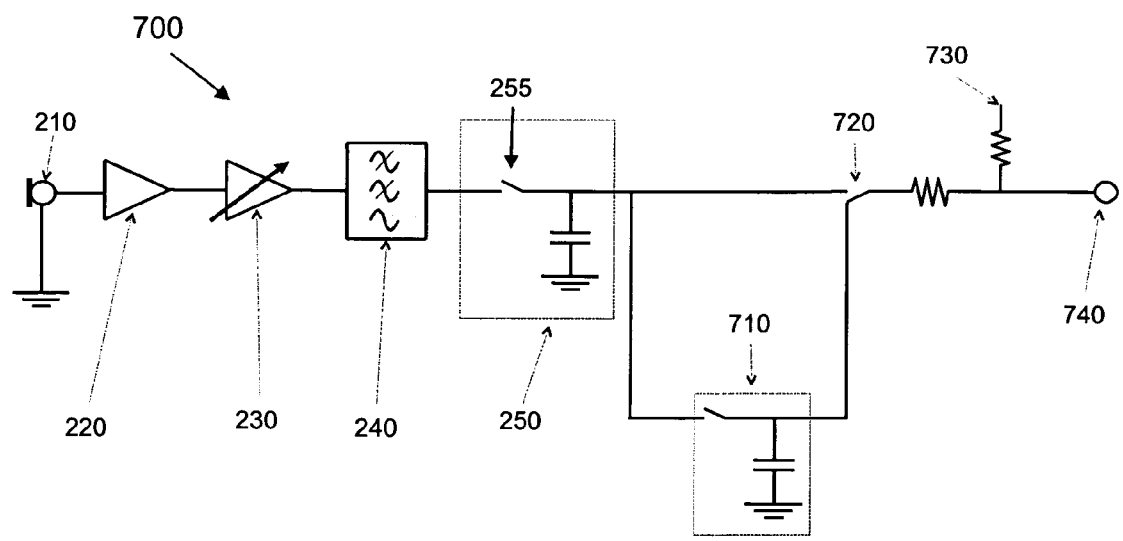
FIG. 7 illustrates an embodiment of the signal conditioning circuitry blocks that can be integrated below the transducer array according to an embodiment of the present invention.

FIG. 7 illustrates an embodiment of the signal conditioning circuitry 700 that can be integrated below the transducer array according to an embodiment of the present invention. This embodiment can achieve a fine delay by slipping the sample and hold's trigger 720. FIG. 7 only shows one stage of course delay 710, but such a delay can contain several stages, for example, a FIFO whose delay is switchable down the beam. Such a FIFO might hold several samples inside it to wait long enough to correctly add an element's voltage to that of the adjacent elements. As will now be evident to those skilled in the art, several methods of implementation for this coarser delay are possible, for example, such as using structures that look like DRAM cells, cascaded track & holds, CCDs or switched-capacitor circuits, all of which are intended to be encompassed within the scope of the present invention. The delayed signals of elevation elements can be summed together 730 and transmitted down an interconnect path 740 to the imaging system.

The advantage of this circuit, which provides partially beam-formed data, is that outputs to the system are lower speed and require less bandwidth, but it does not supply the raw sampled data from every element in the beam-formed direction, so there is some information loss. Such information loss can be acceptable under certain conditions.

Figure 8:
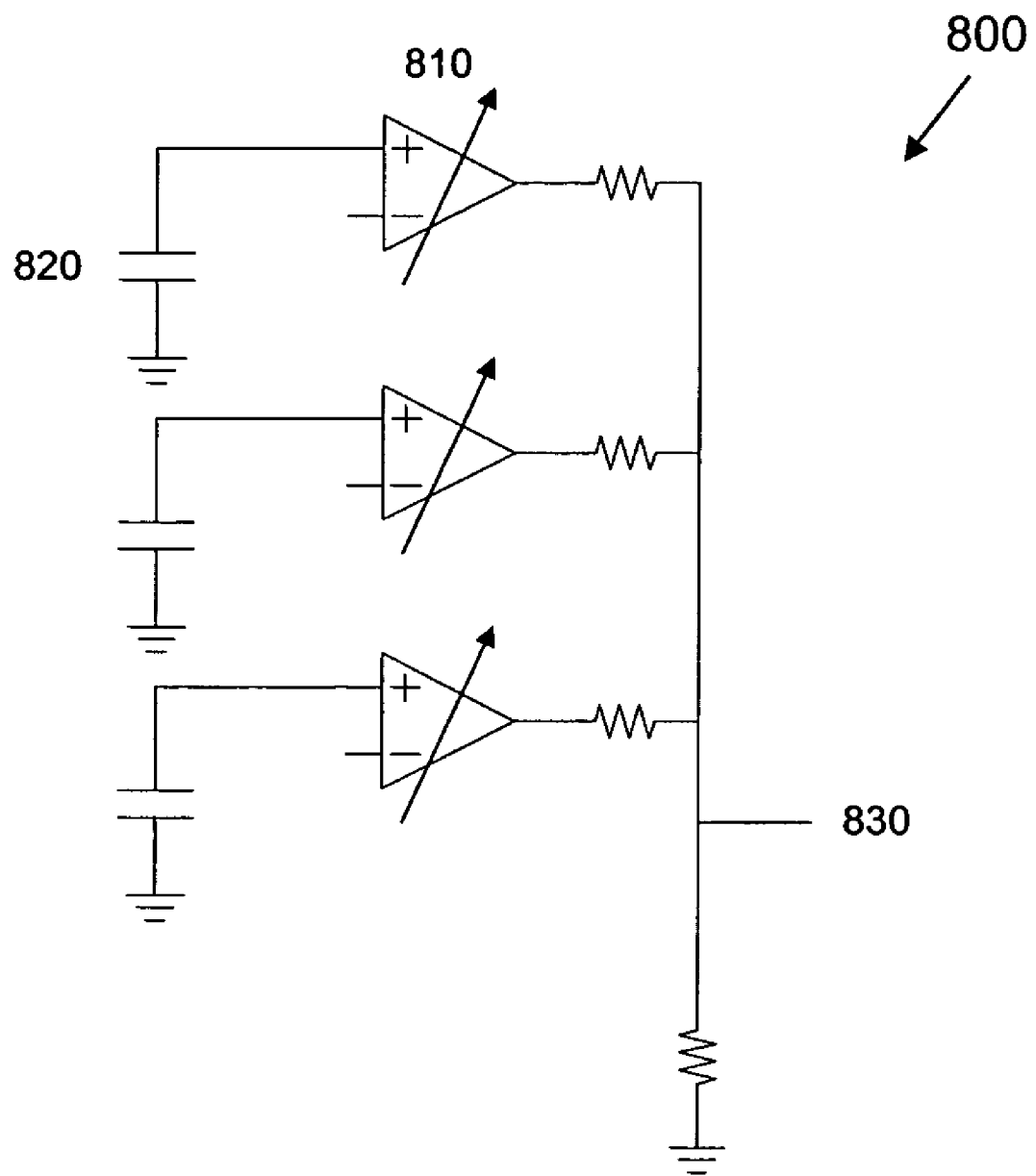
FIG. 8 illustrates one embodiment of a simple adder with time-varying gain used to sum the outputs of amplifiers corresponding to several transducer elements according to an embodiment of the present invention.
Figure 9:
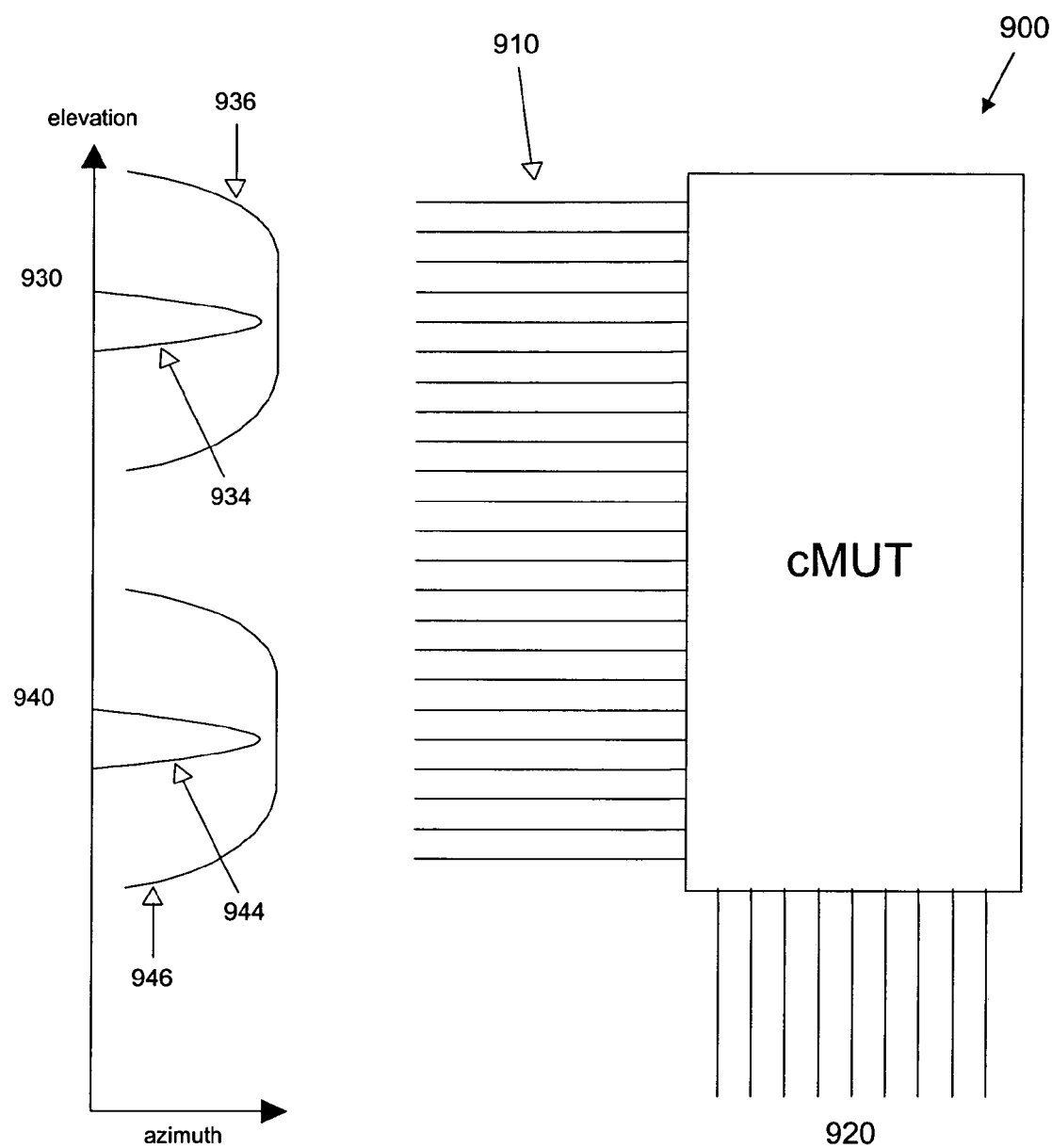
FIG. 9 illustrates the elevation aperture translation and focusing achieved by varying the amplifier gain in the elevation direction according to an embodiment of the present invention.

A further, simplified embodiment of the present invention, one without the need for sample and hold circuitry, is illustrated in FIGS. 8 and 9. In this embodiment, 3-D image formation is made in an analogous manner to mechanical translation of a 1-D probe. Rather than mechanical translation, the aperture of the transducer is electronically translated, for example, in the elevation direction. Only amplifier blocks are needed. Because no sample and hold block is present, an anti-aliasing filter is also unnecessary. Electronic aperture can be translated by controlling the gain of each amplifier in time. FIG. 8 illustrates one embodiment of a simple adder 800 with time-varying gain 810 used to sum the outputs of amplifiers corresponding to several transducer elements 820 to a single output 830 according to an embodiment of the present invention.

In this embodiment, aperture translation is necessary, but not sufficient. For a given aperture position, some degree of elevation focusing would be desirable. Because the aperture is translated, a fixed mechanical lens on the transducer is not possible. However, effective focusing can be achieved by judicious time-based expansion of the aperture. FIG. 9 illustrates the concept by showing 4 time snapshots of the elevation profile 900 of the gain of the amplifier blocks. This gain profile can be achieved in a simple manner by control lines 910 that traverse the electronic circuit chip and connect to the amplifier blocks. Traditional ultrasound cable outputs 920 can be used for this embodiment.

The first two time snapshots are at a first beam position 930. The first time snapshot is the curve of a first short range apodize gain pattern 934. This elevation gain pattern provides for focusing in the short range. The second time snapshot is the curve of a first long range apodize gain pattern 936. By varying the gain smoothly in time from the first short range snapshot to the first long-range snapshot in a manner correlated with the speed of sound in the subject of interest, a narrow slice thickness for the first beam position 930 can be achieved. The next two time snapshots are at a second beam position 940. This second beam position 940 can likewise include a second short range gain pattern 944 and a second long-range gain pattern 946. In order to form a 3-D image, many such beam positions, each providing for smooth gain variation to generate thin image slice thickness, are required. The advantage of this fully, electronically translated and focused aperture is that trade-offs between frame rate and image slice thickness (which translates to resolution in the elevation direction) can be made, and all the control is achieved by M signal lines in an N by M transducer matrix.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

The invention claimed is:

1. An apparatus for ultrasonic imaging, the apparatus comprising:
   a chip;

a transducer array having a plurality of receive transducer elements that forms part of the chip, each receive transducer element adapted to produce received analog ultrasonic signals on a signal line; and a plurality of conditioning circuits adapted to provide signal conditioning to the received analog ultrasonic signals and produce conditioned analog ultrasonic imaging data signals, each conditioning circuit forming another part of the chip, being disposed substantially below one of the transducer elements associated therewith, including an analog sample and hold circuit, and being coupled to one of the signal lines and one of a plurality of intermediate outputs.

2. The apparatus of claim 1, further including
means for outputting analog ultrasonic imaging data signals based upon the conditioned analog ultrasonic imaging data signals, the means for outputting being coupled to the plurality of intermediate outputs and forming another part of the chip.

3. The apparatus of claim 2 wherein each of the analog sample and hold circuits sequentially output samples of the received analog ultrasonic signal associated therewith.

4. The apparatus of claim 3 wherein each of the analog sample and hold circuits sequentially samples the received analog ultrasonic signals at a predetermined rate to produce the samples.

5. The apparatus of claim 3 wherein:
the plurality of conditioning circuits are grouped into a plurality of sets;
the analog sample-and-hold circuits associated with different ones of the receive transducer elements in each set are triggered at different times; and
an adder circuit associated with each set sums together stored voltages representing the samples within each set to produce the conditioned analog ultrasonic imaging data signals.

6. The apparatus according to claim 5, wherein the analog sample and hold circuits each include a trigger and a storage circuit and the trigger is triggered at a predetermined clock rate so that the sample in each storage circuit is available for at least a duration of a period associated with the clock rate.

7. The apparatus of claim 5 wherein each of the plurality of sets is an elevation group, each elevation group formed in an elevation direction and arranged adjacently in azimuth, each of the plurality of elevation groups including at least two of the receive transducer elements.

8. The apparatus according to claim 7, wherein the adder circuit includes a plurality of adders, each adder coupled between one of the sample and hold circuits and one of the intermediate outputs, wherein each adder is further coupled to the intermediate output of the adjacent receive transducer element within the respective elevation group.

9. The apparatus of claim 5 wherein the means for outputting includes a line amplifier coupled to each of the plurality of intermediate outputs, wherein the line amplifiers output the analog ultrasonic imaging data signals.

10. The apparatus of claim 2 wherein the conditioned analog ultrasonic imaging data signals associated with each receive transducer element comprise a plurality of samples of the received analog ultrasonic signals.

11. The apparatus of claim 10, wherein
the means for outputting includes at least one multiplexer.

12. The apparatus of claim 11, wherein:
the plurality of conditioning circuits are grouped into a plurality of sets;
the analog sample-and-hold circuits associated with different ones of the receive transducer elements in each set are triggered at substantially the same time based upon a predetermined clock rate to obtain the corresponding samples for a given clock period;

the at least one multiplexer includes a plurality of serial time-based multiplexers, with at least one of the plurality of serial time-based multiplexers associated with each of the plurality of sets and which multiplexes different ones of the conditioned analog ultrasonic imaging data signals within the set during a duration of the clock period associated with the clock rate; and the means for outputting further includes a line amplifier coupled to an output of each serial time-based multiplexer, wherein the line amplifiers output the analog ultrasonic imaging data signals.

13. The apparatus of claim 10 wherein the plurality of conditioning circuits are grouped into a plurality of sets, and each of the plurality of sets is an elevation group, each elevation group formed in an elevation direction and arranged adjacently in azimuth, each of the plurality of elevation groups including at least two of the receive transducer elements.

14. The apparatus of claim 13, wherein
adjacent receive transducer elements of different elevation groups form a plurality of azimuth groups;
one or more of a plurality of elevation control lines are coupled to the sample and hold circuits associated with the receive transducer elements of each azimuth group;
each azimuth group's sample and hold circuit is triggered at a different time by a trigger signal transmitted over a corresponding one of the plurality of elevation control lines.

15. The apparatus according to claim 2 wherein the analog ultrasonic imaging data signals output from the means for outputting over a period of time contain sufficient information to render a 3-d image of an object.

16. The apparatus of claim 1, wherein the receive transducer elements are selected from a group of transducer types including a microfabricated ultrasonic transducer, a piezoelectric PVDF polymer transducer, a piezoelectric sol gel film transducer, and piezoelectric PZT transducer.

17. The apparatus according to claim 1, wherein the plurality of conditioning circuits is disposed in a substrate of the chip.

18. The apparatus according to claim 1, wherein each of the plurality of conditioning circuits further comprises an amplifier stage with a low noise amplifier coupled between the receive signal line and the associated analog sample and hold circuit.

19. The apparatus according to claim 18, wherein each amplifier stage further includes a variable gain amplifier.

20. The apparatus according to claim 19, wherein each of the plurality of conditioning circuits further comprises an anti-aliasing filter coupled between the amplifier stage and the sample and hold circuit of that circuit.

21. The apparatus according to claim 20, wherein the amplifier stage includes an input impedance that is approximately a complex conjugate of the associated one of the plurality of receive transducer elements.

22. The apparatus according to claim 20, wherein the amplifier stage increases gain with increasing time during a receive period.

23. The apparatus according to claim 20, wherein the anti-aliasing filter attenuates frequency content above a Nyquist frequency.

* * * * *